US007959832B2

(12) United States Patent
Yasuda et al.

(10) Patent No.: US 7,959,832 B2
(45) Date of Patent: Jun. 14, 2011

(54) TRANSPARENT CONDUCTOR

(75) Inventors: Noriyuki Yasuda, Tokyo (JP); Chieko Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 634 days.

(21) Appl. No.: 11/413,043

(22) Filed: Apr. 28, 2006

(65) Prior Publication Data

US 2006/0269737 A1 Nov. 30, 2006

(30) Foreign Application Priority Data

Apr. 28, 2005 (JP) ................................ P2005-133528

(51) Int. Cl.
*H01B 1/02* (2006.01)
*H01B 1/08* (2006.01)
*F21V 9/06* (2006.01)
*B32B 27/32* (2006.01)
*B32B 9/00* (2006.01)

(52) U.S. Cl. .................. 252/518.1; 252/520.1; 359/361; 428/523; 428/689

(58) Field of Classification Search ............... 252/518.1, 252/520.1; 359/361; 428/523, 689
See application file for complete search history.

(56) References Cited

U.S. PATENT DOCUMENTS 4,157,417 A * 6/1979 Murphy ........................ 428/344
4,911,864 A * 3/1990 Sato et al. ................ 252/519.31
5,504,133 A * 4/1996 Murouchi et al. ............ 524/430
5,591,517 A * 1/1997 Takamiya et al. .......... 428/304.4
5,770,314 A * 6/1998 Suga et al. .................... 428/412
5,859,722 A * 1/1999 Suga et al. .................... 359/265
5,962,148 A * 10/1999 Nishimura et al. ........... 428/522
6,191,884 B1 * 2/2001 Takizawa et al. ............. 359/359
6,200,680 B1 * 3/2001 Takeda et al. ................. 428/402
6,210,787 B1 * 4/2001 Goto et al. ................. 428/301.4
6,261,684 B1 * 7/2001 Takahashi et al. ............ 428/345
6,319,613 B1 * 11/2001 Takeda et al. ................. 428/412
6,522,463 B1 * 2/2003 Shimomura et al. .......... 359/350
6,646,022 B2 * 11/2003 Okazaki et al. ............... 522/153
2003/0144420 A1 7/2003 Tsumura et al.
2005/0073507 A1 * 4/2005 Richter et al. ................ 345/174
2005/0176582 A1 * 8/2005 Arai et al. ..................... 503/201
2005/0214526 A1 * 9/2005 Klein et al. ................... 428/328
2007/0079869 A1 * 4/2007 Yukinobu ...................... 136/263

FOREIGN PATENT DOCUMENTS

JP A-06-308473 11/1994
JP A-08-078164 3/1996
JP A-11-170426 6/1999
JP A-11-273874 10/1999
JP A-2000-149664 5/2000

(Continued)

OTHER PUBLICATIONS

Gordon, R., "Criteria for Choosing Transparent Conductors," www.mrs.org/publications/bulletin pp. 52-57 (Aug. 2000).*

*Primary Examiner* — Mark Kopec
*Assistant Examiner* — Jaison P Thomas
(74) *Attorney, Agent, or Firm* — Oliff & Berridge, PLC

(57) ABSTRACT

The present invention is a transparent conductor containing electrically conductive particles, a binder, and an ultraviolet absorber. The transparent conductor of the present invention is so arranged that the ultraviolet absorber in the transparent conductor absorbs ultraviolet light even during irradiation of the transparent conductor with ultraviolet light, and is thus able to suppress influence of ultraviolet light on the electrically conductive particles.

6 Claims, 4 Drawing Sheets

FOREIGN PATENT DOCUMENTS

| | | |
|---|---|---|
| JP | A-2001-076534 | 3/2001 |
| JP | A-2001-328194 | 11/2001 |
| JP | A-2003-11281 | 1/2003 |
| JP | A-2003-36729 | 2/2003 |
| JP | A-2003-128984 | 5/2003 |
| JP | A-2004-182984 | 7/2004 |
| TW | 526241 | 4/2003 |
| WO | WO 2005041217 A1 * | 5/2005 |

* cited by examiner

TRANSPARENT CONDUCTOR

BACKGROUND OF THE INVENTION

1. Field of the Invention

The present invention relates to a transparent conductor.

2. Related Background Art

Transparent electrodes are used in LCDs, PDPs, organic ELs, touch panels, and so on, and transparent conductors are used as the transparent electrodes. The transparent conductors include those obtained by deposition of a sputtered film (electrically conductive layer) on a substrate, and those obtained by forming an electrically conductive layer consisting of electrically conductive particles and a binder. However, as those transparent conductors are used over long periods of time, they tend to vary their electric resistance.

There are thus transparent conductors proposed to suppress the variation of electric resistance; for example, the conventional materials proposed as resin for fixing the conductive particles include optically transparent, electrically conductive materials using phenoxy resin believed to have low hygroscopicity, or mixed resin of phenoxy resin and epoxy resin, or polyvinylidene fluoride (e.g., reference is made to Japanese Patent Applications Laid-Open No. 08-78164 and Laid-Open No. 11-273874).

SUMMARY OF THE INVENTION

However, even with the transparent conductors described in the foregoing Laid-Open No. 08-78164 or Laid-Open No. 11-273874, the resistance can vary through long-term use.

The present invention has been accomplished in view of the above circumstances and an object of the invention is to provide a transparent conductor capable of well suppressing the variation of electric resistance.

The Inventors conducted elaborate research in order to solve the above problem and found that the electric resistance of the transparent conductor itself varied when the transparent conductor absorbed ultraviolet light. The Inventors confirmed from this finding that with the transparent conductor exposed to ultraviolet light, the conductive particles absorbed the energy of ultraviolet light to be activated by some mechanism and to vary their electric conductivity. Then the Inventors further conducted elaborate research and found that the above problem was solved by the invention described below, thus accomplishing the present invention.

Specifically, the present invention provides a transparent conductor comprising an electrically conductive particle, a binder, and an ultraviolet absorber. The transparent conductor in the present invention embraces those of a film-like form and a plate-like form; the film-like transparent conductors are those having the thickness in the range of 50 nm to 1 mm, and the plate-like transparent conductors are those having the thickness of over 1 mm.

In the case of the transparent conductor of the present invention, the ultraviolet absorber in the transparent conductor absorbs ultraviolet light even if the transparent conductor is exposed to ultraviolet light; therefore, it is feasible to suppress the influence of ultraviolet light on the electrically conductive particle. Therefore, the transparent conductor of the present invention is able to well suppress the variation of electric resistance of the transparent conductor.

The transparent conductor preferably comprises an electrically conductive layer containing the electrically conductive particle and the binder, and an ultraviolet absorbing layer containing the ultraviolet absorber.

When the conductive particle and binder, and the ultraviolet absorber are contained in the separate layers, the ultraviolet light incident from the opposite side to the conductive layer, onto the ultraviolet absorbing layer, is absorbed by the ultraviolet absorber in the ultraviolet absorbing layer, whereby the ultraviolet light is adequately prevented from reaching the conductive layer. Therefore, the transparent conductor of the present invention is able to more adequately suppress the variation of electric resistance of the transparent conductor, when compared with the case where the conductive particle, binder, and ultraviolet absorber are present in the same layer.

Furthermore, since in this case the conductive particle and binder, and the ultraviolet absorber are contained in the separate layers, the conductive particle can be more firmly fixed by the binder in the conductive layer, whereby the mechanical strength of the conductive layer can be enhanced.

Preferably, the ultraviolet absorber has at least one derivative selected from the group consisting of a triazine ring, benzotriazole, benzophenone, benzoyl methane, and hydroxybenzoate, or an azo group in a molecule.

The foregoing ultraviolet absorber can be suitably applied to use of the transparent conductor. Namely, even under exposure to ultraviolet light, it is feasible to more adequately suppress the influence of ultraviolet light on the conductive particle. Furthermore, even if the transparent conductor contains the ultraviolet absorber as described above, it is also feasible to secure sufficient transparency of the transparent conductor.

Preferably, the ultraviolet absorber has at least one inorganic material selected from the group consisting of titanium oxide, zinc oxide, iron oxide, aluminum oxide, cerium oxide, zirconium oxide, mica, kaolin, and sericite.

When the ultraviolet absorber has one of these inorganic materials, the transparent conductor has excellent moisture resistance. The ultraviolet absorber itself may be one of these inorganic materials.

The transparent conductor is preferably one comprising an electrically conductive particle and an ultraviolet absorbing binder.

In the above transparent conductor, the ultraviolet absorbing binder is able to absorb ultraviolet light even if the transparent conductor is exposed to ultraviolet light. For this reason, it is feasible to suppress the influence of ultraviolet light on the electrically conductive particle. Therefore, the transparent conductor comprising the conductive particle and the ultraviolet absorbing binder is able to well suppress the variation of electric resistance due to exposure to ultraviolet light.

The binder is preferably an acrylic resin. In this case, when compared with cases using other binders, the transmittance of the transparent conductor can be more enhanced. Namely, the transparent conductor containing the acrylic resin can have higher transparency. The acrylic resin has excellent chemical resistance to acids and alkalis and also has excellent scratch resistance (surface hardness). Therefore, the transparent conductor containing the acrylic resin is more suitably applied to the touch panels and the like which are assumed to be wiped with a wiping agent containing an organic solvent, a surfactant, etc. or to be subjected to contact, friction, etc. between opposed conductive surfaces.

The aforementioned transparent conductor preferably comprises an electrically conductive layer containing the electrically conductive particle and a binder, and an ultraviolet absorbing layer containing the ultraviolet absorbing binder.

When the binder and the ultraviolet absorbing binder are contained in the separate layers, the ultraviolet light incident from the opposite side to the conductive layer, onto the ultraviolet absorbing layer, is absorbed by the ultraviolet absorbing binder in the ultraviolet absorbing layer, whereby the ultraviolet light can be adequately prevented from reaching the binder in the conductive layer. Therefore, the transparent conductor of the present invention is able to more adequately suppress the variation of electric resistance of the transparent conductor, when compared with the case where the binder and the ultraviolet absorbing binder are in the same layer.

Preferably, the ultraviolet absorbing binder has at least one derivative selected from the group consisting of a triazine ring, benzotriazole, benzophenone, benzoyl methane, and hydroxybenzoate, or an azo group in a molecule.

The ultraviolet absorbing binder having one of the functional group or the derivatives is suitably applicable to use of the transparent conductor. Namely, the transparent conductor containing the ultraviolet absorbing binder is able to absorb ultraviolet light and to secure sufficient transparency.

The present invention successfully provides the transparent conductor capable of adequately suppressing the variation of electric resistance due to exposure to ultraviolet light.

DESCRIPTION OF THE PREFERRED EMBODIMENTS

Figure 1:
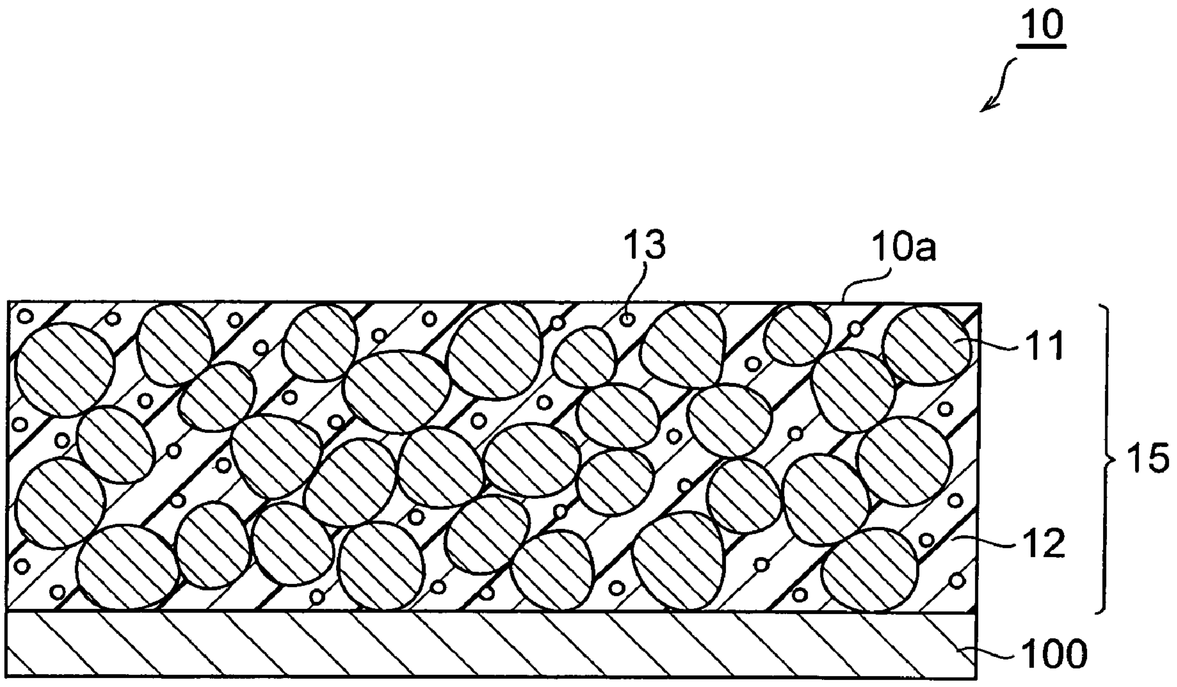
FIG. 1 is a schematic sectional view showing the first embodiment of the transparent conductor according to the present invention.

The preferred embodiments of the present invention will be described below in detail with reference to the drawings according to need. In the drawings the same elements will be denoted by the same reference symbols, without redundant description. It is noted that dimensional ratios in the drawings are not limited to the illustrated ratios.

First Embodiment

First, the first embodiment of the transparent conductor of the present invention will be described.

FIG. 1 is a schematic sectional view showing the first embodiment of the transparent conductor according to the present invention. As shown in FIG. 1, the transparent conductor 10 of the present embodiment has an electrically conductive layer 15 and a substrate 100, and the electrically conductive layer 15 is laid on the substrate 100. The conductive layer 15 is comprised of electrically conductive particles 11, a binder 12, and an ultraviolet absorber 13. The electrically conductive particles 11 are filled inside the conductive layer 15, and the conductive particles 11 and the ultraviolet absorber 13 are fixed in the binder 12. Here the ultraviolet absorber 13 is not chemically bound to the binder 12, but is dispersed in the binder.

In the transparent conductor 10, preferably, the conductive particles 11 are in contact with each other and some of conductive particles 11 are exposed in the surface 10*a* of the transparent conductor 10. In this case, the transparent conductor 10 can have sufficient electric conductivity.

The conductive layer 15 and substrate 100 of the above transparent conductor 10 will be described below.

<Electrically Conductive Layer>

As described above, the conductive layer 15 has the electrically conductive particles 11, the binder 12, and the ultraviolet absorber 13. The conductive particles 11, binder 12, and ultraviolet absorber 13 will be described below in detail.

(Electrically Conductive Particles)

The electrically conductive particles 11 contained in the transparent conductor 10 of the present embodiment are made of a transparent, electrically conductive oxide material. There are no particular restrictions on the transparent, electrically conductive oxide material as long as it has transparency and electric conductivity. The transparent, electrically conductive oxide material is, for example, indium oxide, or indium oxide doped with at least one element selected from the group consisting of tin, zinc, tellurium, silver, gallium, zirconium, hafnium, and magnesium; tin oxide, or tin oxide doped with at least one element selected from the group consisting of antimony, zinc, and fluorine; zinc oxide, or zinc oxide doped with at least one element selected from the group consisting of aluminum, gallium, indium, boron, fluorine, and manganese, or the like.

The average grain size of the conductive particles 11 is preferably 10 nm-80 nm. If the average grain size is less than 10 nm, the electric conductivity of the transparent conductor 10 tends to become more likely to vary than in the case where the average grain size is not less than 10 nm. Namely, the transparent conductor 10 of the present embodiment exhibits the electric conductivity by oxide defects occurring in the conductive particles 11 and, when the average grain size of the conductive particles 11 is less than 10 nm, oxide defects could decrease to vary the electric conductivity, for example, if the outside oxide concentration is high, when compared with the case where the average grain size is in the above range. On the other hand, if the average grain size is over 80 nm, scattering of light becomes significant, for example, in the wavelength region of visible light, as compared with the case where the average grain size is in the above range, and the transmittance of the transparent conductor 10 tends to decrease in the wavelength region of visible light, so as to increase the haze value.

Furthermore, the filling rate of the conductive particles 11 in the transparent conductor 10 is preferably in the range of 10% by volume to 70% by volume. If the filling rate is less than 10% by volume, the electric resistance of the transparent conductor 10 tends to become higher than in the case where the filling rate is in the above range. If the filling rate is over 70% by volume, the mechanical strength of the film forming the conductive layer 15 tends to degrade, when compared with the case where the filling rate is in the above range.

When the conductive particles 11 have the average grain size and the filling rate in the foregoing ranges as described above, the transparent conductor 10 has better transparency and the initial electric resistance thereof can be reduced.

The specific surface area of the conductive particles 11 is preferably in the range of 10 $m^2/g$ to 50 $m^2/g$. If the specific surface area is less than 10 $m^2/g$, optical scattering of visible light tends to increase, when compared with the case where the specific surface area is in the above range. If the specific surface area is over 50 $m^2/g$, stability of the transparent conductor 10 tends to degrade, as compared with the case where the specific surface area is in the above range. The specific surface area stated herein refers to a value measured after a sample is dried at 300° C. in vacuum for 30 minutes, using a specific surface area measuring apparatus (model: NOVA2000, available from Quantachrome Corp.).

(Binder)

The binder 12 contained in the transparent conductor 10 of the present embodiment can be acrylic resin, epoxy resin, polystyrene, polyurethane, silicone resin, fluorine resin, or the like.

Among these, the acrylic resin is preferably used as the binder 12. In this case, the transmittance of the transparent conductor 10 can be more improved than in cases using the other binders. Namely, the transparent conductor 10 containing the acrylic resin can have higher transparency. The acrylic resin has excellent chemical resistance to acids and alkalis and also has excellent scratch resistance (surface hardness). Therefore, the transparent conductor 10 containing the acrylic resin is more suitably applicable to the touch panels and the like assumed to be wiped with a wiping agent containing an organic solvent, a surfactant, and so on or to be subjected to contact, friction, etc. between opposed conductive surfaces.

The binder 12 can also be one obtained by curing a photo-curable compound, a heat-curable compound, or the like except for the above resins. This photo-curable compound may be any organic compound that is cured with light. The heat-curable compound may be any organic compound that is cured with heat. Here the organic compound includes a substance as a raw material for the binder 12 and, specifically, includes a monomer, dimer, trimer, oligomer, or the like that can form the binder 12.

When the binder 12 is one obtained by curing a photo-curable compound, it is feasible to control curing reaction and to cure the compound within a short required time, and it thus provides the advantage of simplifying process management. The photo-curable compound preferably used can be one selected from monomers and others containing a vinyl group or epoxy group, or a derivative thereof. One of these may be used singly, or two or more of them may be used as a mixture.

(Ultraviolet Absorber)

There are no particular restrictions on the ultraviolet absorber 13 contained in the transparent conductor 10 of the present embodiment, but it may be selected from inorganic materials such as titanium oxide, zinc oxide, iron oxide, aluminum oxide, cerium oxide, zirconium oxide, mica, kaolin, and sericite. In this case, the transparent conductor 10 has excellent moisture resistance.

The ultraviolet absorber 13 may also be selected from organic materials such as compounds with an azo group in a molecule, a triazine ring, benzotriazole, benzophenone, benzoyl methane, hydroxybenzoate, or derivatives of these. Among these, the ultraviolet absorber 13 is more preferably one selected from the triazine ring derivatives and the benzotriazole derivatives. In this case, there is the advantage that the transparent conductor 10 has excellent transmittance of visible light. As the aforementioned ultraviolet absorber 13, one of these materials may be used singly, or two or more out of the inorganic materials and the organic materials, out of the inorganic materials, or out of the organic materials may be used as a mixture.

The ultraviolet absorber 13 with these functional groups or derivatives is able to adequately suppress the variation of electric resistance of the electrically conductive particles 11 in the transparent conductor 10 when exposed to ultraviolet light. Furthermore, even if the transparent conductor 10 contains the ultraviolet absorber 13, it is feasible to secure sufficient transparency of the transparent conductor 10 because the wavelengths absorbed by the ultraviolet absorber are mostly not more than 380 nm.

Among these, the ultraviolet absorber 13 is preferably one with a triazine ring or benzotriazole in its molecule, because the ultraviolet absorber 13 absorbs only the ultraviolet light. This presents the advantage that the ultraviolet absorber 13 does not affect transparency in the visible light region.

Particularly, the ultraviolet absorber 13 is preferably one with benzotriazole in its molecule, because benzotriazole has a wide UV-absorbing wavelength region. Therefore, it is feasible to adequately suppress the influence of ultraviolet light on the conductive particles 11 contained in the transparent conductor 10.

An example of the ultraviolet absorber with benzotriazole in its molecule is TINUVIN available from Ciba Specialty Chemicals.

In the conductive layer 15 the content of the ultraviolet absorber 13 is preferably in the range of 0.1% by mass to 5.0% by mass, where the total mass of the conductive layer 15 is 100% by mass. If the content is less than 0.1% by mass, the ultraviolet absorber will fail to absorb ultraviolet light sufficiently and the conductive particles 11 become likely to be affected by ultraviolet light, as compared with the case where the content is in the above range. If the content exceeds 5.0% by mass, it will result in lowering the strength for the binder 12 to fix the conductive particles 11 and the transparent conductor 10 tends to have insufficient mechanical strength, as compared with the case where the content is in the above range.

<Substrate>

In the transparent conductor 10 of the present embodiment, the substrate 100 is not an indispensable layer, but may be optionally provided according to usage of the transparent conductor 10 or the like. In a case where the substrate 100 absorbs ultraviolet light in a specific wavelength range in the ultraviolet region, the ultraviolet absorber 13 is preferably one that absorbs the ultraviolet light with wavelengths other than those in the above specific wavelength range. In this case, the ultraviolet light in the specific wavelength range is absorbed by the substrate 100, and the ultraviolet light with the other wavelengths is absorbed by the ultraviolet absorber 13 in the conductive layer 15. Therefore, the variation of electric resistance is suppressed more adequately.

There are no particular restrictions on the substrate 100 as long as it is made of a transparent material to the visible light. Namely, the substrate 100 may be a well-known transparent film and the substrate 100 can be, for example, one of resin films such as polyester film of polyethylene terephthalate (PET) or the like, polyolefin film of polyethylene, polypropylene, or the like, polycarbonate film, acrylic film, and norbornene film (ARTON or the like available from JSR Corporation). The substrate 100 can also be a substrate of glass, instead of the resin films. The substrate 100 is preferably made of resin only. In this case, the transparent conductor 10 comes to have excellent transparency and flexibility, as compared with cases where the substrate 100 contains resin and another substance except for the resin. Therefore, this transparent conductor 10 is effective, particularly, to use in the touch panels, for example.

In the transparent conductor 10 containing the conductive particles 11, binder 12, and ultraviolet absorber 13 as described above, the ultraviolet absorber 13 in the transparent conductor 10 absorbs ultraviolet light. Therefore, even if the transparent conductor 10 is exposed to ultraviolet light, the conductive particles 11 in the transparent conductor 10 are unlikely to be affected by ultraviolet light and it is thus feasible to adequately suppress the variation of electric resistance of the transparent conductor 10. For this reason, the transparent conductor 10 is able to prevent electric connection from becoming insufficient between the conductive particles 11 and to prevent water from being adsorbed to the transparent conductor 10.

<Production Method>

Next, a production method of transparent conductor 10 of the present embodiment will be described. The method herein will be described for a case where the aforementioned conductive particles 11 are those of indium oxide doped with tin (hereinafter referred to as "ITO").

First, indium chloride and tin chloride are neutralized with an alkali to be coprecipitated (precipitation step). A by-product salt in this reaction is removed by decantation or centrifugal separation. The resulting coprecipitate is dried and a dried body thus obtained is subjected to atmospheric baking and pulverization. The electrically conductive particles 11 are produced in this manner. The baking process is preferably carried out in a nitrogen atmosphere or in a rare gas atmosphere such as helium, argon, or xenon in terms of control of oxygen defects.

The binder 12 and ultraviolet absorber 13 are added into the conductive particles 11 obtained as described above, and they are dispersed each in a liquid to obtain a dispersion liquid. This dispersion liquid may optionally contain an additive such as a photopolymerization initiator, a cross-linking agent, or a surface treatment agent. Examples of the liquid for dispersing the conductive particles 11, binder 12, and ultraviolet absorber include saturated hydrocarbons such as hexane, aromatic hydrocarbons such as toluene and xylene, alcohols such as methanol, ethanol, propanol, and butanol, ketones such as acetone, methyl ethyl ketone, isobutyl methyl ketone, and diisobutyl ketone, esters such as ethyl acetate and butyl acetate, ethers such as tetrahydrofuran, dioxane, and diethyl ether, and amides such as N,N-dimethylacetamide, N,N-dimethylformamide, and N-methylpyrrolidone. The foregoing binder 12 or the monomer or the like thereof may be used as dissolved in the foregoing liquid in certain cases.

The dispersion liquid obtained in this manner is applied onto the substrate 100. This substrate 100 can be preliminarily provided with an anchor layer on the side where the conductive layer 15 is bonded. When the anchor layer is preliminarily provided on the substrate 100, the conductive layer 15 can be more firmly fixed via the anchor layer on the substrate 100. The anchor layer suitably applicable is polyurethane or the like.

Preferably, after the application of the dispersion liquid, a drying step is carried out to obtain an uncured conductive layer. Examples of the application method include the reverse roll method, direct roll method, blade method, knife method, extrusion method, nozzle method, curtain method, gravure roll method, bar coat method, dipping method, kiss coat method, spin coat method, squeeze method, spray method, and so on.

Then the uncured conductive layer on the substrate 100 is cured. When the component in the uncured conductive layer is heat-curable, the heat-curable component is cured by heat to form the conductive layer 15. When the component in the uncured conductive layer is photo-curable, the photo-curable component is cured by irradiation of a high energy beam to form the conductive layer 15. The foregoing high energy beam may be, for example, ultraviolet light, an electron beam, γ-rays, X-rays, or the like.

The conductive layer 15 is formed on one surface of the substrate 100 in this manner, thereby obtaining the transparent conductor 10 shown in FIG. 1. This transparent conductor 10 can be applied to the panel switches such as touch panels and optically transparent switches and is further suitably applicable to use except for the panel switches, e.g., noise suppression parts, heat generators, electrodes for EL, electrodes for backlight, LCDs, PDPs, and so on.

Next, the additives will be described.

<Additives>

(Photopolymerization Initiator)

In the transparent conductor 10 of the present embodiment, as described above, where the component in the uncured conductive layer is a photo-curable compound, the dispersion liquid preferably contains a photopolymerization initiator. In other words, in the case where the binder 12 of the present embodiment is one obtained by curing the photo-curable compound, the binder 12 is preferably one obtained by exposing a mixture of the photo-curable compound and the photopolymerization initiator to light to cure the compound. In this case, the uncured conductive layer is instantaneously cured, and there is thus the advantage that it is easy to secure satisfactory repeatability of film thickness and dimensional accuracy of the conductive layer 15.

The photopolymerization initiator can be one of radical photopolymerization initiators. Among these, the initiator is preferably a radical polymerization initiator that can generate radicals in the visible light region. Normally, the photopolymerization initiator absorbs certain wavelengths in the ultraviolet region to initiate photopolymerization. However, since the transparent conductor 10 contains the ultraviolet absorber 13, the photopolymerization needs to be initiated in a region where there is no overlap between the wavelength region absorbed by the ultraviolet absorber 13 and the wavelength region absorbed by the photopolymerization initiator. The reason for it is that if the photopolymerization should be initiated in a region where there is an overlap between the wavelength region absorbed by the ultraviolet absorber 13 and the wavelength region absorbed by the photopolymerization initiator, the ultraviolet absorber 13 would absorb light and it could impede progress of photopolymerization. The photopolymerization initiator that can generate radicals in the visible light region has a wide band of wavelengths of light capable of initiating the photopolymerization, from the near-ultraviolet region to the visible light region and it is thus feasible to initiate photopolymerization securely even in the case of use of the ultraviolet absorber having a wide absorption range in the ultraviolet region.

(Cross-linking Agent)

The transparent conductor 10 of the present embodiment preferably further contains a cross-linking agent. When the transparent conductor 10 contains the cross-linking agent, the binder can be cross-linked and thus the transparent conductor 10 can be constructed in a denser structure. In this case, it is feasible to prevent external water from permeating into the transparent conductor 10. For this reason, it is feasible to more adequately suppress the variation of electric resistance of the transparent conductor 10 due to permeation of water.

The cross-linking agent is preferably one having a plurality of vinyl groups in its molecule. Since the vinyl groups of the cross-linking agent are bound to binding sites of the binder, the cross-linking agent of this type is able to form as many cross-linking points as the number of vinyl groups. The number of vinyl groups is preferably as many as possible from the above viewpoint and, specifically, it is preferably 2-100. If the number of vinyl groups exceeds 100, the crosslink density tends to decrease because of suppression of free motion, when compared with the case where the number of vinyl groups is within the above range.

(Surface Treatment Agent)

The transparent conductor 10 may contain a surface treatment agent such as a silane coupling agent, a silazane compound, a titanate coupling agent, an aluminate coupling agent, or a phosphonate coupling agent. Among these, the surface treatment agent is preferably a silane coupling agent or a silazane compound.

The surface treatment agent is coupled with hydroxyl groups in surfaces of the conductive particles 11 to make the surfaces of conductive particles 11 hydrophobic. This prevents the transparent conductor 10 from swelling because of absorption of water. In this case, therefore, even if the transparent conductor 10 is used in a high humidity environment or the like over long periods of time, the variation of electric resistance of the transparent conductor 10 can be suppressed well. The surface treatment agent may be one of the above agents used singly, or may be a mixture of two or more.

(Other Additives)

The transparent conductor 10 may optionally further contain other additives. The other additives include a flame retardant, a colorant, a plasticizer, and so on.

Second Embodiment

Next, the second embodiment of the transparent conductor according to the present invention will be described.

Figure 2:
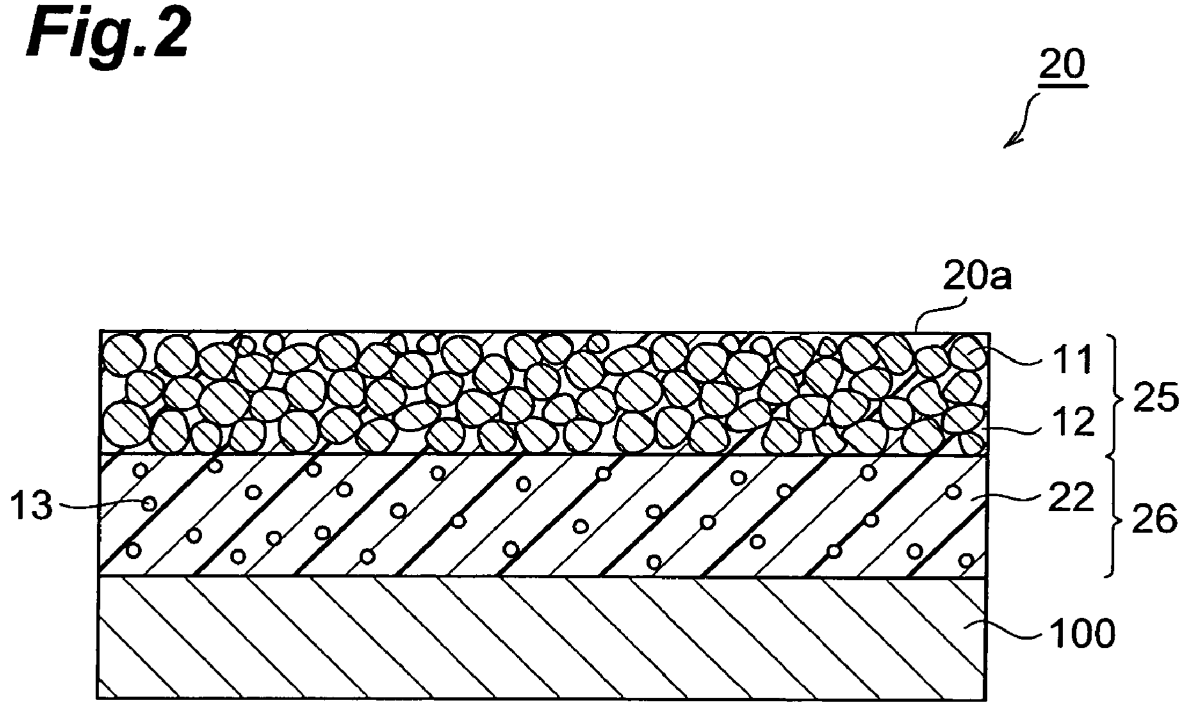
FIG. 2 is a schematic sectional view showing the second embodiment of the transparent conductor according to the present invention.

FIG. 2 is a schematic sectional view showing the second embodiment of the transparent conductor according to the present invention. As shown in FIG. 2, the transparent conductor 20 of the present embodiment has an electrically conductive layer 25 containing electrically conductive particles 11 and a binder 12, an ultraviolet absorbing layer 26 containing an ultraviolet absorber 13, and a substrate 100, and the ultraviolet absorbing layer 26 and the conductive layer 25 are stacked in this order on the substrate 100. The conductive particles 11 are filled inside the conductive layer 25 and the conductive particles 11 are fixed in the binder 12.

In the transparent conductor 20, preferably, the conductive particles 11 are in contact with each other and some of conductive particles 11 are exposed in a surface 20*a* of the transparent conductor 20. In this case, the transparent conductor 20 can have sufficient electric conductivity.

Since the transparent conductor 20 is provided with the ultraviolet absorbing layer 26 between the conductive layer 25 and the substrate 100, it is feasible to suppress degradation of ultraviolet absorbing performance even if the bleeding phenomenon of the ultraviolet absorber 13 occurs in the ultraviolet absorbing layer 26. In contrast to it, if the ultraviolet absorbing layer 26 is located outside the substrate 100 or located as an outermost layer, the bleeding phenomenon of the ultraviolet absorber 13 will occur and the ultraviolet absorber 13 could be reduced, for example, by friction with fingers or the like.

The conductive layer 25 and the ultraviolet absorbing layer 26 of the transparent conductor 20 will be described below.

<Conductive Layer>

As described above, the conductive layer 25 has electrically conductive particles 11 and binder 12. The electrically conductive particles 11 and binder 12 are the same as those described in the first embodiment.

In the transparent conductor 20 the filling rate of the electrically conductive particles 11 in the conductive layer 25 is preferably in the range of 10% by volume to 70% by volume. If the filling rate is less than 10% by volume, the electric resistance of the transparent conductor 20 tends to become higher than in the case where the filling rate is in the above range. If the filling rate is over 70% by volume, the mechanical strength of the conductive layer 25 tends to degrade, when compared with the case where the filling rate is in the above range.

<Ultraviolet Absorbing Layer>

The ultraviolet absorbing layer 26 contains the ultraviolet absorber 13. The ultraviolet absorber 13 is the same as that described in the first embodiment.

The content of the ultraviolet absorber 13 in the ultraviolet absorbing layer 26 is preferably in the range of 0.1% by mass to 5.0% by mass, where the total mass of the ultraviolet absorbing layer 26 is 100% by mass. If the content is less than 0.1% by mass, the ultraviolet absorbing layer will fail to absorb ultraviolet light well and the binder tends to degrade, when compared with the case where the content is in the above range. If the content is over 5.0% by mass, the adhesive strength of the ultraviolet absorbing layer 26 to the conductive layer 25 or to the substrate 100 tends to decrease, as compared with the case where the content is in the above range.

The ultraviolet absorbing layer 26 preferably further contains a binder 22. In this case, the ultraviolet absorber 13 can be fixed by the binder 22.

There are no particular restrictions on the binder 22, but it may be the same component as the aforementioned binder 12 or the same component as the aforementioned substrate 100.

When the conductive particles 11 and binder 12, and the ultraviolet absorber 13 are contained in the separate layers, the ultraviolet light incident from the opposite side to the conductive layer 25, into the ultraviolet absorbing layer 26 is absorbed by the ultraviolet absorber 13 in the ultraviolet absorbing layer 26, whereby the ultraviolet light can be adequately prevented from reaching the conductive particles 11 in the conductive layer 25. Therefore, the transparent conductor 20 is able to more adequately suppress the variation of electric resistance of the transparent conductor 20, when compared with the case where the conductive particles 11, binder 12, and ultraviolet absorber 13 are in the same layer.

Furthermore, since in this case the conductive particles 11 and binder 12 and the ultraviolet absorber 13 are contained in the separate layers, the conductive particles 11 can be more firmly fixed by the binder 12 in the conductive layer 25, whereby the mechanical strength of the conductive layer 25 can also be enhanced.

In the present embodiment the conductive layer 25 may contain the aforementioned cross-linking agent, surface treatment agent, and other additives, and the ultraviolet absorbing layer 26 may contain the aforementioned cross-linking agent and other components.

<Production Method>

Next, a production method of transparent conductor 20 of the present embodiment will be described. The method herein will be described for a case where the aforementioned conductive particles 11 are those of indium oxide doped with tin (hereinafter referred to as "ITO").

First, the ultraviolet absorber 13 is added, for example, into the binder 12 and dispersed in a liquid to obtain a first dispersion liquid. This dispersion liquid may optionally contain an additive such as a photopolymerization initiator or a cross-linking agent. Examples of the liquid for dispersing the ultraviolet absorber 13 and binder 12 include saturated hydrocarbons such as hexane, aromatic hydrocarbons such as toluene and xylene, alcohols such as methanol, ethanol, propanol, and butanol, ketones such as acetone, methyl ethyl ketone, isobutyl methyl ketone, and diisobutyl ketone, esters such as ethyl acetate and butyl acetate, ethers such as tetrahydrofuran, dioxane, and diethyl ether, and amides such as N,N-dimethylacetamide, N,N-dimethylformamide, and N-methylpyrrolidone. The foregoing binder 12 or the monomer or the like thereof may be used as dissolved in the foregoing liquid in certain cases.

The first dispersion liquid obtained in this manner is applied onto the substrate 100. This substrate 100 can be preliminarily provided with an anchor layer on the side where the conductive layer 15 is bonded. When the anchor layer is preliminarily provided on the substrate 100, the ultraviolet absorbing layer 26 can be more firmly fixed via the anchor layer on the substrate 100. The anchor layer suitably applicable is polyurethane or the like.

Preferably, after the application of the first dispersion liquid, a drying step is carried out to obtain an uncured ultraviolet absorbing layer. Examples of the application method include the reverse roll method, direct roll method, blade method, knife method, extrusion method, nozzle method, curtain method, gravure roll method, bar coat method, dipping method, kiss coat method, spin coat method, squeeze method, spray method, and so on.

Then the uncured ultraviolet absorbing layer on the substrate 100 is cured. When the component in the uncured ultraviolet absorbing layer is heat-curable, the heat-curable component is cured by heat to form the ultraviolet absorbing layer 26. When the component in the uncured ultraviolet absorbing layer is photo-curable, the photo-curable component is cured by irradiation with a high energy beam to form the ultraviolet absorbing layer 26. The foregoing high energy beam may be, for example, ultraviolet light, an electron beam, γ-rays, X-rays, or the like.

The ultraviolet absorbing layer 26 is formed in this manner on one surface of the substrate 100.

Next, indium chloride and tin chloride are neutralized with an alkali to be coprecipitated (precipitation step). A by-product salt in this reaction is removed by decantation or centrifugal separation. The resulting coprecipitate is dried and a dried body thus obtained is subjected to atmospheric baking and pulverization. The electrically conductive particles 11 are produced in this manner. The baking process is preferably carried out in a nitrogen atmosphere or in a rare gas atmosphere such as helium, argon, or xenon in terms of control of oxygen defects.

The binder 12 is added into the conductive particles 11 obtained as described above, and is dispersed in a liquid to obtain a second dispersion liquid. This dispersion liquid may optionally contain an additive such as a photopolymerization initiator, a cross-linking agent, or a surface treatment agent. Examples of the liquid for dispersing the conductive particles 11 and binder 12 include saturated hydrocarbons such as hexane, aromatic hydrocarbons such as toluene and xylene, alcohols such as methanol, ethanol, propanol, and butanol, ketones such as acetone, methyl ethyl ketone, isobutyl methyl ketone, and diisobutyl ketone, esters such as ethyl acetate and butyl acetate, ethers such as tetrahydrofuran, dioxane, and diethyl ether, and amides such as N,N-dimethylacetamide, N,N-dimethylformamide, and N-methylpyrrolidone. The foregoing binder 12 or the monomer or the like thereof may be used as dissolved in the foregoing liquid in certain cases.

The second dispersion liquid obtained in this manner is applied onto the ultraviolet absorbing layer 26 provided on the substrate 100. After the application of the second dispersion liquid, a drying step is preferably carried out to obtain an uncured conductive layer. Examples of the application method include the reverse roll method, direct roll method, blade method, knife method, extrusion method, nozzle method, curtain method, gravure roll method, bar coat method, dipping method, kiss coat method, spin coat method, squeeze method, spray method, and so on.

Then the uncured conductive layer on the ultraviolet absorbing layer 26 is cured. When the component in the uncured conductive layer is heat-curable, the heat-curable component is cured by heat to form the conductive layer 25. When the component in the uncured conductive layer is photo-curable, the photo-curable component is cured by irradiation with a high energy beam to form the conductive layer 25. The foregoing high energy beam may be, for example, ultraviolet light, an electron beam, γ-rays, X-rays, or the like.

The conductive layer 25 is formed on one surface of the ultraviolet absorbing layer 26 in this manner, thereby obtaining the transparent conductor 20 shown in FIG. 2. This transparent conductor 20 can be applied to the panel switches such as touch panels and optically transparent switches and is further suitably applicable to use except for the panel switches, e.g., noise suppression parts, heat generators, electrodes for EL, electrodes for backlight, LCDs, PDPs, and so on.

Third Embodiment

Next, the third embodiment of the transparent conductor according to the present invention will be described. The transparent conductor 30 of the third embodiment is different from the first embodiment in that an ultraviolet absorbing binder 32 is used instead of the binder 12 and ultraviolet absorber 13.

Figure 3:
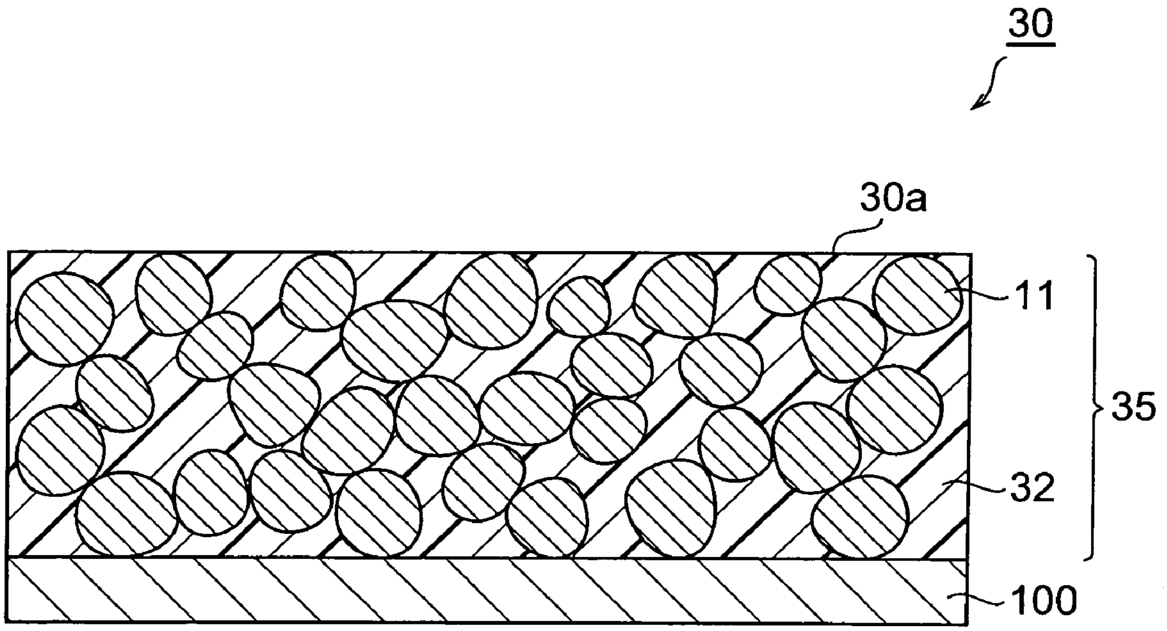
FIG. 3 is a schematic sectional view showing the third embodiment of the transparent conductor according to the present invention.

FIG. 3 is a schematic sectional view showing the third embodiment of the transparent conductor according to the present invention. As shown in FIG. 3, the transparent conductor 30 of the present embodiment has an electrically conductive layer 35 and a substrate 100, and the conductive layer 35 is laid on the substrate 100. The conductive layer 35 has electrically conductive particles 11 and the ultraviolet absorbing binder 32. The electrically conductive particles 11 are filled inside the conductive layer 35 and the electrically conductive particles 11 are fixed in the ultraviolet absorbing binder 32.

In the transparent conductor 30, preferably, the conductive particles 11 are in contact with each other and some of conductive particles 11 are exposed in a surface 30*a* of the transparent conductor 30. In this case, the transparent conductor 30 can have sufficient electric conductivity.

The ultraviolet absorbing binder 32 will be described below.

(Ultraviolet Absorbing Binder)

The ultraviolet absorbing binder 32 may be any resin with a group or derivative capable of absorbing ultraviolet light, such as an azo group, a triazine ring, benzotriazole, benzophenone, benzoyl methane, or hydroxybenzoate in its molecule, and examples of such resin include acrylic resin, epoxy resin, polystyrene, polyurethane, silicone resin, fluorine resin, and so on. The ultraviolet absorbing binder 32 may have one of those alone or two or more of those in its molecule.

Among these, the ultraviolet absorbing binder 32 is preferably a resin having an azo group or at least one derivative selected from the group consisting of a triazine ring, benzotriazole, benzophenone, benzoyl methane, and hydroxybenzoate in a molecule of the ultraviolet absorbing binder 32, and the resin is more preferably an acrylic resin.

This ultraviolet absorbing binder 32 is suitably applicable to use as the transparent conductor. Namely, the transparent conductor 30 containing the ultraviolet absorbing binder is able to absorb ultraviolet light and to secure sufficient transparency.

When the ultraviolet absorbing binder 32 is an acrylic resin, the refractive index of the transparent conductor 30 can be lower than in cases using the other polymers. Namely, the transparent conductor 30 containing the acrylic resin can have higher transparency. The acrylic resin also has excellent chemical resistance to acids and alkalis and excellent scratch resistance (surface hardness). Therefore, the transparent conductor 30 containing the acrylic resin is suitably applicable to the touch panels and the like assumed to be wiped with a wiping agent containing an organic solvent, a surfactant, and so on and to be subjected to contact, friction, etc. between opposed conductive surfaces.

There are no particular restrictions on a production method of the ultraviolet absorbing binder 32, but a potential method is, for example, a method of polymerizing a plurality of polymers including at least one monomer with the aforementioned functional group or derivative. The foregoing ultraviolet absorbing binder 32 can also be produced, for example, by a method of reacting a compound having the aforementioned functional group, with a polymer having a leaving group and not having the aforementioned functional group, to replace the leaving group with the compound.

When the production method of the ultraviolet absorbing binder 32 is the method of polymerizing a plurality of polymers including at least one monomer with the foregoing functional group or the derivative, each of these monomers may be polymerized singly or two or more of these may be mixed and copolymerized.

The monomer with the functional group or the derivative may be copolymerized with a monomer without the functional group or the derivative. The monomer without the functional group or the derivative can be an acrylic monomer or the like. One type of the monomer without the functional group or the derivative may be singly copolymerized with the monomer having the functional group or the derivative, or two or more types of monomers without the functional group or the derivative may be mixed and copolymerized with the monomer having the functional group or the derivative.

When the production method of the ultraviolet absorbing binder 32 is the method of reacting the compound having the functional group or the derivative with the polymer without the functional group or the derivative, the polymer can be acrylic resin, epoxy resin, polystyrene, polyurethane, silicone resin, fluorine resin, or the like. The compound with the functional group or the derivative can be an alcohol, a carboxylic acid, or the like with the functional group or the derivative.

The ultraviolet absorbing binder 32 is preferably one obtained by curing a photo-curable compound. When the ultraviolet absorbing binder 32 is one obtained by curing the photo-curable compound, it is feasible to control the curing reaction and to cure the binder within a short required time, and there is thus the advantage of simplifying process management.

There are no particular restrictions on a rate of the functional group or the derivative in a molecule of the ultraviolet absorbing binder 32 in the transparent conductor 30 of the present embodiment, but the rate of the functional group or the derivative in the binder molecule is preferably in the range of 0.1% by mass to 5.0% by mass, where the total mass of the binder molecule is 100% by mass. If the content is less than 0.1% by mass, the binder will fail to absorb ultraviolet light well and the conductive particles 11 become likely to be affected by ultraviolet light, when compared with the case where the content is in the above range. If the content exceeds 5% by mass, the transparency tends to degrade in the visible light region and the transparent conductor 30 tends to have insufficient mechanical strength, when compared with the case where the content is in the above range.

The ultraviolet absorbing binder 32 is able to absorb ultraviolet light even when the transparent conductor 30 is exposed to ultraviolet light. Therefore, the ultraviolet absorbing binder 32 is able to adequately suppress the variation of electric resistance of the transparent conductor 30.

Since the ultraviolet absorbing binder 32 is a polymer, it is unlikely to bleed. Therefore, the transparent conductor is able to inhibit occurrence of microcracks and reduction of ultraviolet absorbing effect due to bleeding.

In the present embodiment the conductive layer 35 may also contain the aforementioned cross-linking agent, surface treatment agent, and other additives.

This transparent conductor 30 can be applied to the panel switches such as touch panels and optically transparent switches and is further suitably applicable to use except for the panel switches, e.g., noise suppression parts, heat generators, electrodes for EL, electrodes for backlight, LCDs, PDPs, and so on.

Fourth Embodiment

Next, the fourth embodiment of the transparent conductor according to the present invention will be described. The transparent conductor of the fourth embodiment is different from the second embodiment in that the ultraviolet absorbing layer contains an ultraviolet absorbing binder 32 instead of the ultraviolet absorber 13. The ultraviolet absorbing binder is the same as the ultraviolet absorbing binder 32 described in the above third embodiment.

Figure 4:
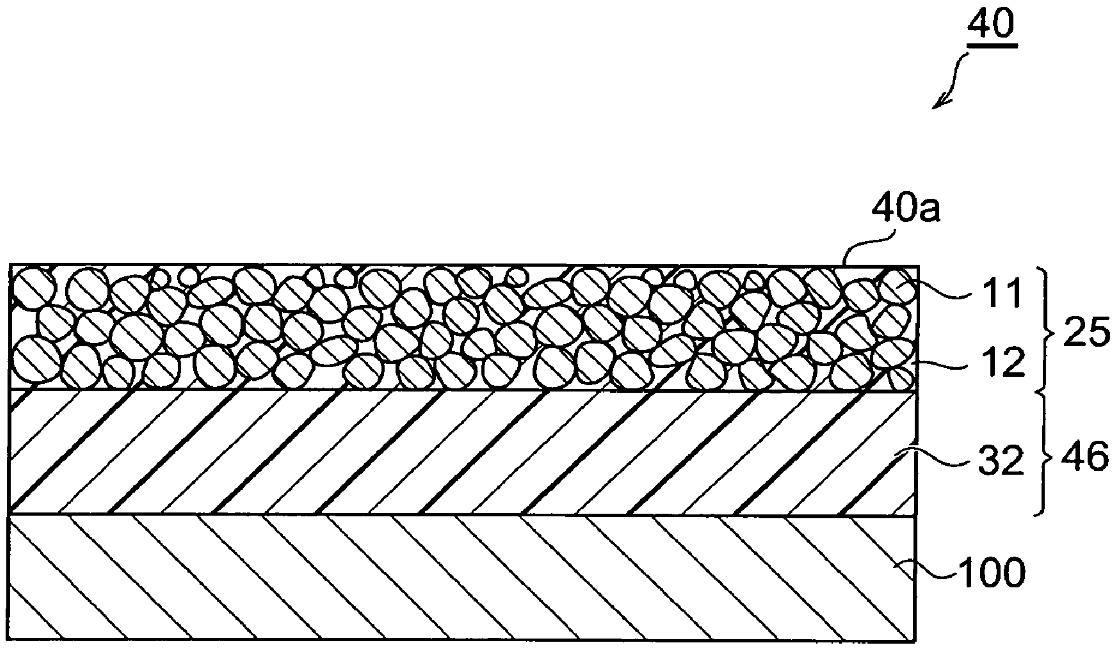
FIG. 4 is a schematic sectional view showing the fourth embodiment of the transparent conductor according to the present invention.

FIG. 4 is a schematic sectional view showing the fourth embodiment of the transparent conductor according to the present invention. As shown in FIG. 4, the transparent conductor 40 of the present embodiment has an electrically conductive layer 25 containing electrically conductive particles 11 and a binder 12 an ultraviolet absorbing layer 46 containing the ultraviolet absorbing binder 32, and a substrate 100, and the ultraviolet absorbing layer 46 and the conductive layer 25 are stacked in this order on the substrate 100. The electrically conductive particles 11 are filled inside the conductive layer 25 and the conductive particles 11 are fixed in the binder 12.

In the transparent conductor 40, preferably, the conductive particles 11 are in contact with each other and some of conductive particles 11 are exposed in a surface 40*a* of the transparent conductor 40. In this case, the transparent conductor 40 can have sufficient electric conductivity.

When the binder 12 and the ultraviolet absorbing binder 32 are contained in the separate layers, the ultraviolet absorbing binder 32 in the ultraviolet absorbing layer 46 absorbs ultraviolet light incident from the opposite side to the conductive layer 25, into the ultraviolet absorbing layer 46, whereby the ultraviolet light can be adequately prevented from reaching the binder 12 in the conductive layer 25. Therefore, the transparent conductor 40 is able to more adequately suppress the variation of electric resistance of the transparent conductor 40, when compared with the case where the binder 12 and the ultraviolet absorbing binder 32 are in the same layer.

In the present embodiment the conductive layer 25 may contain the aforementioned cross-linking agent, surface treatment agent, and other additives, and the ultraviolet absorbing layer 46 may also contain the aforementioned cross-linking agent and other components.

This transparent conductor 40 can be applied to the panel switches such as touch panels and optically transparent switches and is further suitably applicable to use except for the panel switches, e.g., noise suppression parts, heat generators, electrodes for EL, electrodes for backlight, LCDs, PDPs, and so on.

EXAMPLES

The present invention will be described below in further detail with examples thereof, but it is noted that the present invention is by no means intended to be limited to these examples.

(Preparation of Electrically Conductive Particles)

An aqueous solution obtained by dissolving 19.9 g of indium chloride tetrahydrate (available from KANTO CHEMICAL CO., INC) and 2.6 g of stannic chloride (available from KANTO CHEMICAL CO., INC) in 980 g of water was mixed with ammonia water (available from KANTO CHEMICAL CO., INC) diluted ten-fold with water, to generate a white precipitate (coprecipitate).

The liquid containing the generated precipitate was subjected to solid-liquid separation by a centrifugal separator, thereby obtaining a solid body. It was further put into 1000 g of water and dispersed by a homogenizer, followed by solid-liquid separation with the centrifugal separator. The dispersion and solid-liquid separation were repeated five times and thereafter the solid body was dried and heated at 600° C. in a nitrogen atmosphere for one hour, thereby obtaining ITO powder (electrically conductive particles).

Example 1

One end of polyethylene terephthalate (PET) film (substrate which is available from Teijin Limited and which has the thickness of 100 μm) in the rectangular shape of 10 cm×30 cm was stuck onto a glass substrate with a two-sided adhesive tape, to fix the substrate on the glass substrate.

Then a first mixed solution was made by mixing 36 parts by mass of polyethyleneglycol diacrylate (trade name: A-600 available from SHIN-NAKAMURA CHEMICAL CO., LTD), 12 parts by mass of 2-hydroxy-3-phenoxypropyl acrylate (trade name: 702A available from SHIN-NAKAMURA CHEMICAL CO., LTD), one part by mass of TINUVIN900 (benzotriazole ultraviolet absorber available from Ciba Specialty Chemicals), and two parts by mass of a photopolymerization initiator (a mixture of equal parts of IRGACURE819 and IRGACURE184 available from Ciba Specialty Chemicals) in 50 parts by mass of methyl ethyl ketone (MEK available from KANTO CHEMICAL CO., INC).

This first mixed solution was applied onto the substrate by the bar coat method so that the thickness after cured became 10 μm. Then it was cured by UV irradiation under the cumulative illuminance of 1000 mJ/cm$^2$ using a high-pressure mercury lamp as a light source, to form an ultraviolet absorbing layer.

A second mixed solution was then prepared by mixing 150 parts by mass of ITO powder (average grain size 30 nm), 20 parts by mass of ethoxylated bisphenol A diacrylate (trade name: A-BPE-20 available from SHIN-NAKAMURA CHEMICAL CO., LTD), 35 parts by mass of polyethyleneglycol dimethacrylate (trade name: 14G available from SHIN-NAKAMURA CHEMICAL CO., LTD), 25 parts by mass of 2-hydroxy-3-phenoxypropyl acrylate (trade name: 702A available from SHIN-NAKAMURA CHEMICAL CO., LTD), 10 parts by mass of urethane-modified acrylate (trade name: UA-512 available from SHIN-NAKAMURA CHEMICAL CO., LTD), 10 parts by mass of an acrylic polymer (having the average molecular weight of about 50000 and containing an average of 0.50 acryloyl groups and 25 triethoxysilane groups per molecule), and 1 part by mass of a photopolymerization initiator (trade name: IRGACURE907 available from Ciba Specialty Chemicals) in 50 parts by mass of methyl ethyl ketone (MEK available from KANTO CHEMICAL CO., INC).

This second mixed solution was applied onto the ultraviolet absorbing layer by the bar coat method so that the thickness after cured became 50 μm. It was cured by UV irradiation under the cumulative illuminance of 3000 mJ/cm$^2$ using a high-pressure mercury lamp as a light source, to form a conductive layer.

The glass substrate was then separated from the structure including the substrate, ultraviolet absorbing layer, and conductive layer, thereby obtaining a transparent conductor.

Example 2

One end of polyethylene terephthalate (PET) film (substrate which is available from Teijin Limited and which has the thickness of 100 μm) in the rectangular shape of 10 cm×30 cm was stuck onto a glass substrate with a two-sided adhesive tape, to fix the substrate on the glass substrate.

A third mixed solution was then prepared by mixing 150 parts by mass of ITO powder (average grain size 30 mn), 20 parts by mass of ethoxylated bisphenol A diacrylate (trade name: A-BPE-20 available from SHIN-NAKAMURA CHEMICAL CO., LTD), 35 parts by mass of polyethyleneglycol dimethacrylate (trade name: 14G available from SHIN-NAKAMURA CHEMICAL CO., LTD), 25 parts by mass of 2-hydroxy-3-phenoxypropyl acrylate (trade name: 702A available from SHIN-NAKAMU CHEMICAL CO., LTD), 10 parts by mass of urethane-modified acrylate (trade name: UA-512 available from SHIN-NAKAMU CHEMICAL CO., LTD), 10 parts by mass of an acrylic polymer (having the average molecular weight of about 50000 and containing an average of 50 acryloyl groups and 25 triethoxysilane groups per molecule), 2 parts by mass of TINUVIN900 (benzotriazole ultraviolet absorber available from Ciba Specialty Chemicals), and 2 parts by mass of a photopolymerization initiator (a mixture of equal parts of IRGACURE819 and IRGACURE184 available from Ciba Specialty Chemicals) in 40 parts by mass of methyl ethyl ketone (MEK available from KANTO CHEMICAL CO., INC).

This third mixed solution was applied onto the substrate by the bar coat method so that the thickness after cured became 50 μm. It was then cured by UV irradiation under the cumulative illumination of 3000 mJ/cm$^2$ using a high-pressure mercury lamp as a light source, to form a conductive layer.

Then the glass substrate was separated from the structure including the substrate and conductive layer, thereby obtaining a transparent conductor.

Example 3

A transparent conductor was made in the same manner as in Example 2 except that the acrylic polymer used in Example 2 was replaced by an acrylic polymer having the average molecular weight of about 100000 and containing an average of 50 acryloyl groups, 25 triethoxysilane groups, and 100 2-(2-benzotriazolyl)-cresol per molecule and that TINUVIN900 was not used.

Example 4

A transparent conductor was made in the same manner as in Example 3 except that 2-(2-benzotriazolyl)-cresol in the acrylic polymer used in Example 3 was changed to 4-hydroxy benzophenone.

Example 5

A transparent conductor was made in the same manner as in Example 1 except that 2 parts by mass of zinc oxide (primary particle size 15 nm) was added in the first mixed solution used in Example 1.

Comparative Example 1

A transparent conductor was made in the same manner as in Example 2 except that TINUVIN900 was not used.

[Evaluation Method]

(Evaluation of Resistance of Transparent Conductors)

The transparent conductors obtained in Examples 1-5 and Comparative Example 1 were evaluated as to their electric resistance in the following manner. Specifically, each of the transparent conductors obtained as described above was cut in the size of 50 mm square, electrodes were made from a silver conductive paste and in the width of 5 mm from arbitrary opposed end faces on the surface of the conductive layer, and a digital multimeter (PC5000 available from Sanwa Electric Instrument Co., Ltd) was connected between the electrodes. These were placed in a darkroom, a black light (model number FL6BLB available from TOSHIBA LIGHTING & TECHNOLOGY CORPORATION) was set at the position of 20 cm vertically up from the surface of the conductive layer, and each sample was exposed to near-ultraviolet light with the peak wavelength of 352 nm. The electric resistance before irradiation with near-infrared light was defined as an initial resistance, the electric resistance after one-hour irradiation was defined as a resistance after burdened, and a change rate was calculated based on the following formula:

change rate=resistance after burdened/initial resistance.

The results are presented in Table 1.

TABLE 1

| | Initial resistance kΩ/□ | Resistance after burdened kΩ/□ | Change rate |
|---|---|---|---|
| Example 1 | 3.66 | 3.59 | 0.98 |
| Example 2 | 3.24 | 3.18 | 0.98 |
| Example 3 | 3.57 | 3.46 | 0.97 |
| Example 4 | 3.71 | 3.49 | 0.94 |
| Example 5 | 3.44 | 3.41 | 0.99 |
| Comparative Example 1 | 3.49 | 2.97 | 0.85 |

As apparent from Table 1, it was proved that Examples 1-5 demonstrated smaller variation of electric resistance than Comparative Example 1 and that the variation of electric resistance was thus adequately suppressed in Examples 1 to 5. The above results confirmed that the transparent conductors of the present invention were able to adequately suppress the variation of electric resistance even in a high-moisture environment.

What is claimed is:

1. A transparent conductor comprising:

a substrate made of a resin only;

an electrically conductive layer composed of electrically conductive particles made of a transparent, electrically conductive oxide material, and a binder made of an acrylic resin; and an ultraviolet absorbing layer positioned between the electrically conductive layer and the substrate, and containing an ultraviolet absorber and a binder made of an acrylic resin, the content of the ultraviolet absorber being in the range of 0.1% to less than 5.0% by mass of the ultraviolet aborbing layer.

2. A transparent conductor according to claim 1, wherein the substrate is provided with an anchor layer on a side where the conductive layer is layered.

3. The transparent conductor according to claim 2, wherein the anchor layer is made of polyurethane.

4. The transparent conductor according to claim 1, wherein the ultraviolet absorber has at least one derivate selected from the group consisting of triazine ring and benzotriazole. norbornene film.

5. The transparent conductor according to claim 1, wherein the substrate is the one selected from the group consisting of polyethylene, terephthalate film, polyethylene film, polypropylene film, polycarbonate film, acrylic film and

6. The transparent conductor according to claim 1, wherein the substrate is polyethylene terephthalate film.

* * * * *